(12) United States Patent
Cornic et al.

(10) Patent No.: US 10,551,488 B2
(45) Date of Patent: Feb. 4, 2020

(54) MULTI-RESOLUTION FMCW RADAR DETECTION METHOD AND RADAR IMPLEMENTING SUCH A METHOD

(71) Applicant: THALES, Courbevoie (FR)

(72) Inventors: Pascal Cornic, Guilers (FR); Patrick Le Bihan, Lannilis (FR); Jean-Michel Quellec, Ploumoguer (FR)

(73) Assignee: THALES, Courbevoie (FR)

( * ) Notice: Subject to any disclaimer, the term of this patent is extended or adjusted under 35 U.S.C. 154(b) by 348 days.

(21) Appl. No.: 15/649,356

(22) Filed: Jul. 13, 2017

(65) Prior Publication Data

US 2018/0045819 A1 Feb. 15, 2018

(30) Foreign Application Priority Data

Aug. 11, 2016 (FR) ...................................... 16 01224

(51) Int. Cl.
*G01S 13/34* (2006.01)
*G01S 13/93* (2006.01)
(Continued)

(52) U.S. Cl.
CPC .............. *G01S 13/34* (2013.01); *G01S 13/28* (2013.01); *G01S 13/343* (2013.01); *G01S 13/36* (2013.01);
(Continued)

(58) Field of Classification Search
CPC ........ G01S 13/28; G01S 13/34; G01S 13/343; G01S 13/36; G01S 13/505; G01S 13/605; G01S 13/93; G01S 13/931
(Continued)

(56) References Cited

U.S. PATENT DOCUMENTS 6,317,073 B1 * 11/2001 Tamatsu .................. G01S 7/352
342/109
2010/0277361 A1 11/2010 Focke et al.
(Continued)

FOREIGN PATENT DOCUMENTS

EP 0 863 409 A1 9/1998
FR 2 987 683 A1 9/2013

*Primary Examiner* — Timothy X Pham
(74) *Attorney, Agent, or Firm* — Baker & Hostetler LLP

(57) ABSTRACT

A detection method implementing an FMCW waveform is provided, the emitted waveform is formed of a recurring pattern of given period Tr covering an emission frequency band of given width B, each pattern being divided into a given number P of sub-patterns of duration Tr/P covering an excursion frequency band ΔF=B/P, the sub-patterns being mutually spaced by a frequency interval equal to ΔF. The radar performs: a first distance-compression processing operation carrying out a low-resolution distance compression at the scale of each recurring pattern on a fraction B/P of the emission band of width B corresponding to the frequency band covered by each of the sub-patterns; a Doppler processing operation on a given number N of successive recurrences so as to form P ambiguous distance-Doppler maps of low distance resolution, the maps being segmented into various speed domains; a second distance-compression processing operation of resolution that differs depending on the speed domain to which the relative speed of the target with respect to the radar belongs.

14 Claims, 5 Drawing Sheets

(51) Int. Cl.
*G01S 13/28* (2006.01)
*G01S 13/36* (2006.01)
*G01S 13/50* (2006.01)
*G01S 13/60* (2006.01)

(52) U.S. Cl.
CPC .......... *G01S 13/505* (2013.01); *G01S 13/605* (2013.01); *G01S 13/93* (2013.01); *G01S 13/931* (2013.01)

(58) Field of Classification Search
USPC ....................................................... 342/109
See application file for complete search history.

(56) References Cited

U.S. PATENT DOCUMENTS

| | | | |
|---|---|---|---|
| 2011/0187586 A1* | 8/2011 | Cornic | G01S 7/352 342/196 |
| 2015/0061928 A1* | 3/2015 | Cornic | G01S 13/343 342/25 R |
| 2016/0116570 A1 | 4/2016 | Ramasubramanian et al. | |
| 2016/0131742 A1 | 5/2016 | Schoor | |

* cited by examiner

MULTI-RESOLUTION FMCW RADAR DETECTION METHOD AND RADAR IMPLEMENTING SUCH A METHOD

CROSS-REFERENCE TO RELATED APPLICATIONS

This application claims priority to foreign French patent application No. FR 1601224, filed on Aug. 11, 2016, the disclosure of which is incorporated by reference in its entirety.

FIELD OF THE INVENTION

The present invention relates to a multi-resolution radar detection method employing an FMCW emission wave. It also relates to a radar implementing such a method. The invention is in particular applicable to the field of automotive radars. More generally it may be applicable to FMCW radars.

BACKGROUND

Automotive radars have been integrated into driver aids the role of which is rather to increase comfort: for example adaptive cruise controllers (ACC) for use on motorways or controllers with "Stop and Go" functionality for use in urban driving. They use microwaves and in particular the 76-81 GHz band.

Technological progress has allowed present-day applications to also target anticollision-type safety functions, and it is also envisaged in the relatively near term to achieve entirely autonomous vehicles, the environment being perceived by an association of a number of sensors based on various technologies: radar, video and infrared in particular.

Because of its all-weather nature, the radar remains in this context a sensor of key importance and its detection and discrimination capacities must be high in order to guarantee the overall reliability of the system. As regards collision prevention, the radar sensor must in particular be able to distinguish, among the stationary objects that it detects, those that correspond to elements of road infrastructure and those that correspond to vehicles parked on the road, which potentially are a collision risk. In this context, it is in particular essential that the radar does not generate false alarms liable to lead the vehicle to brake or perform an emergency avoidance manoeuvre without real cause, in particular when the vehicle is moving at high speed. This requires a high sensitivity and high discrimination capacity, allowing the situation in front of the vehicle to be sensed at large distances, typically larger than 200 m. It may also be necessary to detect the edges of roads.

In this context, distance resolution must be very high for stationary objects, this meaning that many distance boxes are needed to cover the range of the radar and therefore that the digital processing power required to carry out the processing in real time is very high. In the case of a digital beamforming radar, which must simultaneously process a plurality of angular directions, this required processing power is multiplied by the number of beams to be processed.

Moreover, as regards automotive radars, the cost of the sensor is extremely constrained, and the available computational resources are therefore limited. For an automotive application, it is therefore necessary to find ways of optimising the use of processing resources depending on the context.

One technical problem to be solved is that of obtaining a satisfactory discrimination capacity while limiting the impact on processor load. To this day, this problem has not been solved or not satisfactorily.

Automotive radars use different waveforms for short-range and long-range detection, these two modes being exclusive. These waveforms are mainly what are called frequency-modulated continuous-wave (FMCW) or frequency-shift-keying frequency-modulated continuous-wave (FSK-FMCW) waveforms. FMCW waveforms may alternate over time different frequency ramps either to optimise the emission band depending on the desired range, or to solve distance/speed ambiguity problems inherent to this type of radar. This leads to a decrease in waveform efficiency since the various emission patterns share the radar integration time.

In urban mode, at low speeds, distance resolution is given priority. It is typically less than one metre, this corresponding to a large "instantaneous" emission band, typically of several hundred megahertz. In contrast the distance domain is small, and the number of distance boxes to be processed remains modest.

On the motorway, at high speeds, speed resolution is given priority, this implying a high Doppler resolution, typically of about 25 Hz, corresponding to a discrimination of 5 cm/sec for a radar operating at 76 GHz.

The latter case corresponds to operation in ACC mode in which the distance to vehicles in front of the carrier of the radar is managed via speed. Distance resolution is relatively low, typically of a few metres, and does not allow a sufficient discrimination of obstacles to automatically engage emergency braking at high speeds. Here again, the number of distance boxes to be processed remains modest because of the low resolution, even though the distance domain is larger.

Neither of these two operating modes therefore allows a high-speed anticollision function, which requires both a high distance resolution and a high speed resolution, to be achieved.

SUMMARY OF THE INVENTION

One aim of the invention is in particular to solve the aforementioned problem. To this end, one subject of the invention is a radar target-detection method implementing an FMCW waveform, the emitted waveform being formed of a recurring pattern of given period Tr covering an emission frequency band of given width B, each pattern being divided into a given number P of sub-patterns of duration Tr/P covering an excursion frequency band $\Delta F=B/P$, said sub-patterns being mutually spaced by a frequency interval equal to $\Delta F$, said method performing at least:

a first distance-compression processing operation carrying out a low-resolution distance compression at the scale of each recurring pattern on a fraction B/P of said emission band of width B corresponding to the frequency band covered by each of said sub-patterns;

a Doppler processing operation on a given number N of successive recurrences so as to form P ambiguous distance-Doppler maps of low distance resolution, said maps being segmented into at least two speed domains one of which corresponds to stationary targets;

a second distance-compression processing operation on said distance maps, the resolution of which is dependent on the speed domain to which the expected speed of said target belongs.

In said first processing operation said compression consists, for each sub-pattern, in a distance compression by direct demodulation of the emitted signal with the received signal, followed by an M/P-point Fourier transform in a synchronous demodulation operation leading, for each pattern, to the formation of M/2P distance boxes, M/P being an integer.

Said Doppler processing operation for example performs, on said N successive recurrences, a Fourier transform on the Doppler axis for each of said distance boxes and for each sub-pattern, leading to the formation of said P distance-Doppler maps, each being M/2P distance boxes by N Doppler boxes in size.

Said resolution is for example maximum for stationary targets. Said expected speed corresponding to a stationary target, the second processing operation for example performs the compression to the maximum resolution by carrying out the coherent integration of said P distance-Doppler maps in each of a number of distance filters centred on said sub-patterns of resolution $$\frac{C}{2B},$$

C being the speed of light. Said coherent integration is for example carried out after compensation of delays and frequency differences between said sub-patterns.

Said expected speed corresponding to a moving target, said second processing operation carries out a coherent integration over all of said distance-Doppler maps in order to produce a new distance-Doppler map, said coherent integration being carried out in such a way that a coherent integration is carried out on each group of distance-Doppler maps corresponding to sub-patterns covering adjacent frequency bands.

In one possible embodiment, said expected speed being high, above a given threshold, the second processing operation performs the non-coherent integration of at least two distance-Doppler maps of the same distance resolution.

The order of said sub-patterns is for example modified from one emission burst to the following.

The period Tr of said recurring pattern is for example adjusted depending on the speed of the carrier of said radar and on the emission frequency in order to meet the condition of Doppler un-ambiguity for targets approaching at maximum speed.

Digital beamforming being carried out on reception on each of said distance-Doppler maps of low distance resolution, the second processing operation is for example carried out for each beam.

In one particular implementation, said distance resolution depends on the direction of the beam on reception.

The ambiguity in the distance measurement is for example removed by the measurement of the Doppler frequency.

The invention also relates to an FMCW radar able to implement such a method. It for example being possible to equip a motor vehicle with this radar.

BRIEF DESCRIPTION OF THE DRAWINGS

Other features and advantages of the invention will become apparent from the following description, which is given with reference to the appended drawings, which show.

DETAILED DESCRIPTION

Figure 1:
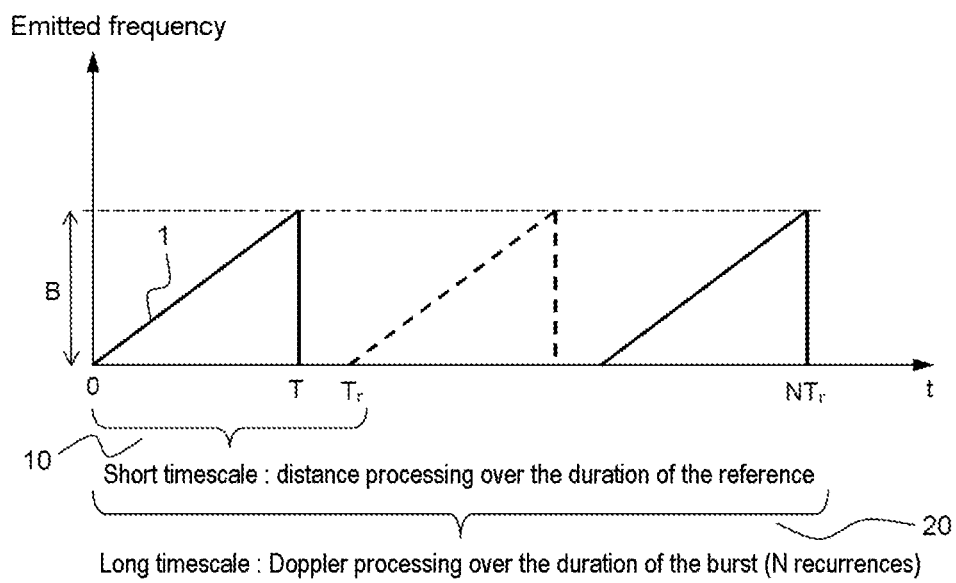
FIG. 1, an FMCW radar waveform used in the prior art.

FIG. 1 recalls the prior art. More particularly, it illustrates the modulation of the emitted frequency, this modulation being of FMCW type.

Generally, an automotive radar mounted on a vehicle, and the beam of which is oriented toward the front of the latter, will be considered. This radar implements a linearly frequency-modulated waveform according to the FMCW principle, well known to those skilled in the art, and as shown in FIG. 1. A first processing operation is carried out on a short timescale, at the scale of the recurrence 10 of duration Tr, aiming to separate the received signals via direct demodulation followed by digitisation of the signals and a P-point FFT, the P points corresponding to the duration of the frequency ramp 1.

This operation carries out a compression on the distance axis. On output from this processing operation, the signals are distributed into P/2 ambiguous distance boxes, the beat frequency $f_b$ of a received signal corresponding to a distance D and of Doppler frequency $F_d$ being written:

$$f_b = \frac{2BD}{CT} + F_d \qquad (1)$$

where:
B is the emitted frequency band;
C is the speed of light;
D is the distance of the target;
T is the duration of the frequency ramp;
$F_d$ is the Doppler frequency.

The distance frequency is given by:

$$f_{dist} = \frac{2BD}{CT} \qquad (2)$$

and the distance resolution $\Delta D$ is given, according to the conventional relationship, by:

$$\Delta D = \frac{C}{2B}$$

Moreover the Doppler frequency $F_d$ is given by the relationship $$F_d = \frac{2V_r}{\lambda}$$

where $V_r$ is the radial speed of the target and λ is the wavelength of the emission signal.

Following this "short timescale" processing operation, a "long timescale" second processing operation is carried out, consisting, for each ambiguous distance box, in carrying out a second N-point FFT (or DFT), the N points corresponding to the duration $NT_r$ of a Doppler burst 20.

As output from this processing operation, a distance-speed map (or distance-Doppler map) comprising, for P/2 ambiguous distance boxes, N unambiguous speed filters, is thus obtained. For each cell of the ambiguous distance-speed map having given rise to a detection, the estimation of the unambiguous Doppler frequency $F_d$ allows, from Equation (1), the distance frequency of each of the detected signals to be unambiguously deduced from:

$$f_{dist} = f_b - F_d$$

The Doppler resolution $\Delta F_d$ is given by $$\Delta F_d = \frac{1}{NT_r},$$

where N is the number of recurrences in the Doppler burst.

The terms distance-Doppler and distance-speed will be used interchangeably below, these two terms being equivalent because the Doppler measurement corresponds to a speed measurement.

In such a radar, the processing requires N P-point fast Fourier transforms (FFTs) for the distance compression and P/2 N-point FFTs for the Doppler compression, this implying a need for powerful processing means.

For example, for a maximum detection distance of 384 metres and a distance resolution of 1.5 metres, P=512.

If it is assumed that there is no Doppler ambiguity, for a maximum speed $V_{rmax}$ of 130 km/h, i.e. 36 m/sec, and a wavelength λ of 3.9 mm, the maximum duration of the recurrence is in this case Tr=27 μsec.

Considering a Doppler burst duration typically of about 40 ms and choosing a number of recurrences N that is a power of 2, N=2048 is obtained for a recurrence duration Tr=19.5 μsec.

It is therefore necessary to carry out 2048 512-point FFTs and 256 2048-point FFTs for each reception channel of the radar, during the duration of the Doppler burst, i.e. 40 ms, as the processing needs to be carried out in real-time. For a digital beamforming radar comprising Q beams, it is necessary, for each element of the distance-speed map of P/2×N size, to in addition carry out an angular compression via a Q-point FFT. The processing load to be processed in real-time is thus very high with respect to the available technological resources, in particular if it is desired to use low-cost processing means.

Figure 2:
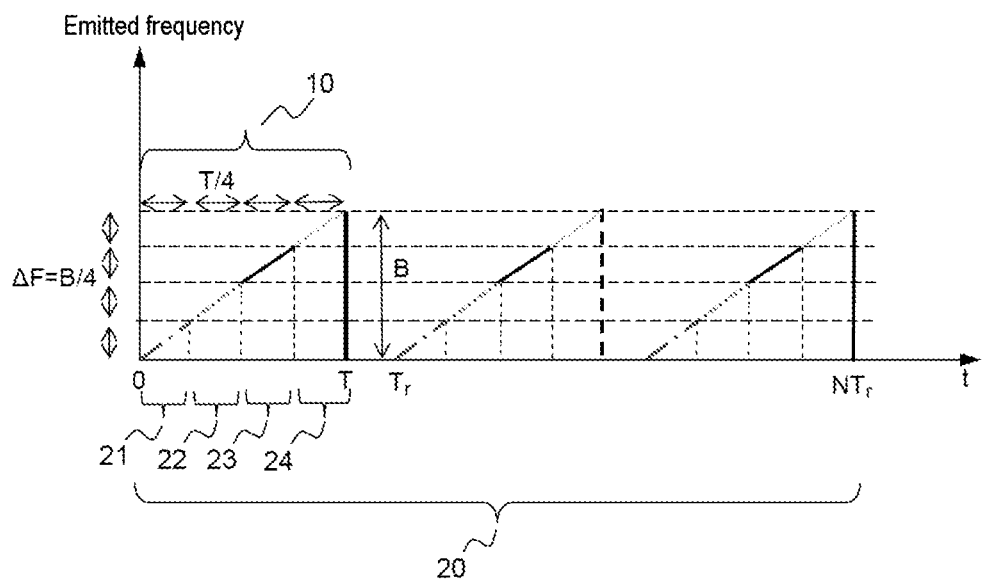
FIG. 2, an FMCW radar waveform according to the invention.

FIG. 2 illustrates the processing carried out by the method according to the invention. To carry out the processing, an emission waveform, of the FMCW type, with sub-patterns such as illustrated in FIG. 2 is emitted. More precisely, the emission waveform is formed from a pattern of recurrence period Tr, each pattern being formed of P sub-patterns 21, 22, 23, 24 of duration Tr/P corresponding to an excursion frequency ramp $\Delta F = B/P$, the patterns being mutually spaced by a frequency interval $\Delta F$, the whole lot thus covering the complete band B. In the example of FIG. 2, P=4.

Having divided the recurring pattern into P sub-patterns, the FMCW waveform is chosen, before the radar processing begins, depending on the speed of the carrier of the radar and of the traffic situation. Then, in a second step, the maximum distance resolution of the radar is set.

Therefore, the recurrence frequency of the radar is chosen, beforehand, depending on the speed of the carrier in order to guarantee Doppler unambiguity for the targets of interest having the maximum speed of approach.

On a motorway, typically, this maximum speed corresponds to the speed of the carrier or even to the speed of approach of stationary obstacles, typically 130 km/hour in France. Of course another maximum speed value may be considered.

On a road, this speed corresponds to the maximum relative speed of two vehicles approaching from opposite directions, typically 180 km/hour in France. Of course, other speed values are possible.

Thus, the maximum value of the repetition period of the waveform is set so as to respect the Nyquist criterion for the maximum relative speed, this corresponding to the relationship:

$$T_r < \frac{\lambda}{4V_{rmax}}$$

where $V_{rmax}$ is the maximum relative speed of the targets in question, λ the wavelength of the radar and Tr the recurrence period.

The repetition frequency 1/Tr may thus be automatically adjusted between two patterns, depending on the speed of the carrier and on the emission frequency F to meet the condition of Doppler unambiguity for targets approaching at the maximum speed.

The maximum distance resolution of the radar is also set in order not to generate migration from distance box to distance box for targets approaching at the maximum speed during the coherent integration time corresponding to the duration $NT_r$ of the Doppler burst, typically 40 ms.

For example, for a maximum speed $V_{rmax}$ of 130 km/h, i.e. 36 m/sec, the maximum distance resolution ΔD is 1.5 metres, corresponding to the relative movement of the target during the burst of 40 ms duration.

The maximum useful band emitted by the radar is in this $$\text{in this case} = \frac{C}{2\Delta D},$$

i.e. in this example: B=100 MHz.

By way of example, Table 1 below indicates, for a motorway situation, the maximum theoretical values of the duration of the recurrence and of the useful emission band depending on carrier speed.

TABLE 1

| Carrier speed | 50 km/h | 70 km/h | 90 km/h | 110 km/h | 130 km/h |
|---|---|---|---|---|---|
| Maximum relative speed of targets on the motorway, corresponding to the speed of approach of stationary targets | 50 km/h | 70 km/h | 90 km/h | 110 km/h | 130 km/h |

TABLE 1-continued

| | | | | | |
|---|---|---|---|---|---|
| Maximum duration of the recurrence Tr | 70 μs | 50 μs | 39 μs | 32 μs | 27 μs |
| Maximum distance resolution ΔD for stationary targets | 0.6 m | 0.8 m | 1 m | 1.2 m | 1.5 m |
| Maximum useful band B for stationary targets | 250 MHz | 180 MHz | 150 MHz | 125 MHz | 100 MHz |

In the same way, Table 2 below indicates, for a road situation, the maximum theoretical values of the duration of the recurrence and of the useful emission band for stationary targets and moving targets, depending on carrier speed, considering an emission frequency of 76 GHz. Here, an oncoming vehicle with a maximum speed of 90 km/h is considered.

TABLE 2

| | | | | | |
|---|---|---|---|---|---|
| Carrier speed | 10 km/h | 30 km/h | 50 km/h | 70 km/h | 90 km/h |
| Maximum relative speed for stationary targets | 10 km/h | 30 km/h | 50 km/h | 70 km/h | 90 km/h |
| Maximum relative speed for moving targets | 100 km/h | 120 km/h | 140 km/h | 160 km/h | 180 km/h |
| Maximum duration of the recurrence Tr | 35 μs | 29 μs | 25 μs | 22 μs | 19 μs |
| Maximum distance resolution ΔD for stationary targets | 0.1 m | 0.3 m | 0.5 m | 0.8 m | 1 m |
| Maximum useful band for stationary targets | 1.5 GHz | 500 MHz | 300 MHz | 180 MHz | 150 MHz |
| Maximum distance resolution ΔD for moving targets | 1.1 m | 1.3 m | 1.6 m | 1.8 m | 2 m |
| Maximum useful band for moving targets | 140 MHz | 115 MHz | 95 MHz | 80 MHz | 75 MHz |

These parameters allow, depending on various speed ranges of the carrier and depending on the conditions of use of the radar, i.e. typically on roads or motorways, the following to be set:
  the complete band to be emitted to obtain the maximum distance resolution for stationary targets;
  the useful maximum band for moving targets;
  the maximum duration of the radar recurrence.

Once these choices have been made, the complete emission band B and the duration $T_r$ of the recurrence are set.

The recurrence period $T_r$ is then divided into P sub-patterns of duration T/P, each pattern corresponding to an excursion frequency ramp ΔF=B/P of slope B/T, the patterns being mutually spaced by a frequency interval ΔF, the whole lot thus covering the complete band B in a time T. In the rest of the description P will be equal to 4.

The frequency ramps may follow one after the other continuously as illustrated in FIG. 2.

Figure 3:
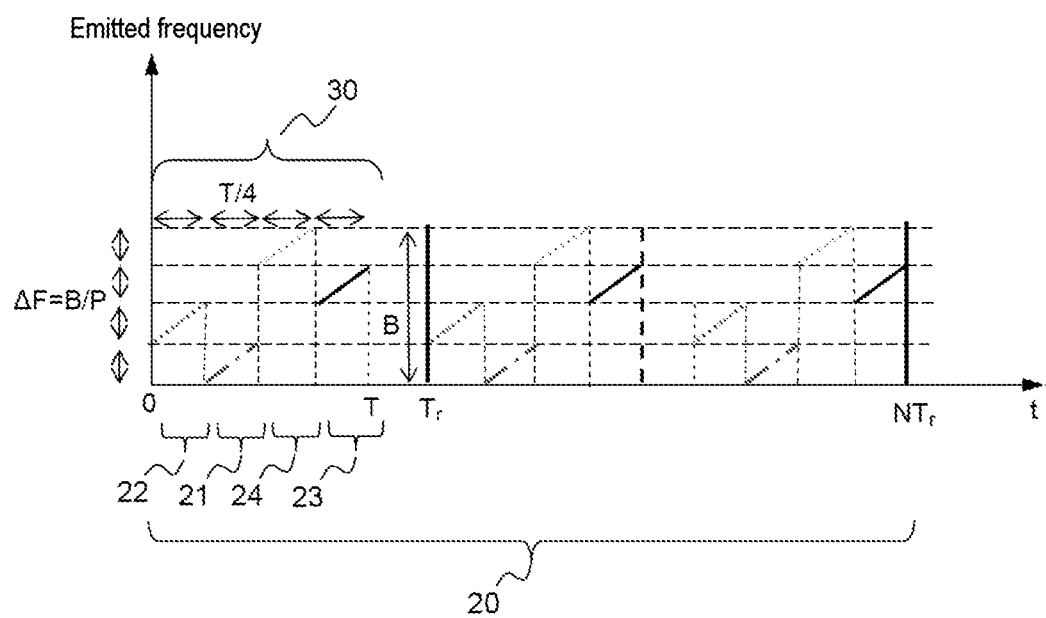
FIG. 3, an FMCW radar waveform according to the invention in which the sub-patterns are presented in a different order.

FIG. 3 illustrates an example in which the sub-patterns 21, 22, 23, 24 are placed in an arbitrary order.

Figure 4:
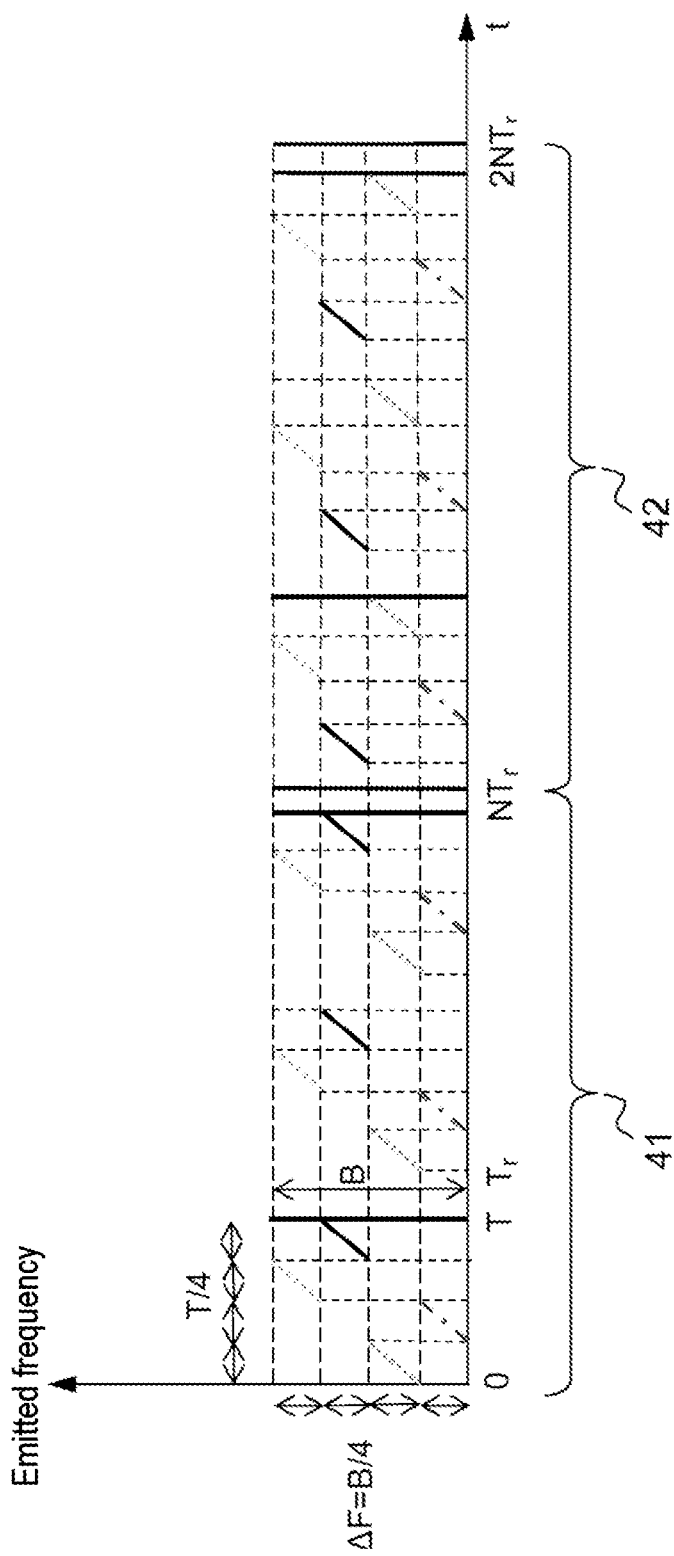
FIG. 4, two successive radar emission bursts of a wave according to the invention.

FIG. 4 illustrates the case of two consecutive bursts 41, 42 in which the order of the sub-patterns has changed between the two bursts. Preferably, the order of succession of the sub-patterns is modified from one Doppler burst to the following, so as to decrease the probability of interference between radars of the same type, as illustrated in FIG. 4.

There may be a dwell time in the emission, from one recurrence to the following (case where the ramp duration is shorter than the recurrence period, i.e. T<Tr) or, more generally, between two successive patterns. However, it is necessary for these dwell times to be of equal duration and for emission phase continuity to be respected.

On the basis of the waveforms and sub-patterns thus generated, the processing applied on reception is presented below. This processing in particular carries out the following operations:

carrying out, for each sub-pattern, a first what is called low-resolution distance processing operation consisting in a distance compression by direct demodulation of the emitted signal with the received signal, followed by an M/P-point Fourier transform (FTT) (M/P being an integer) in a conventional, FMCW-radar synchronous demodulation processing operation, this processing operation leading, for each pattern, to the formation of M/2P distance boxes;
  performing, on a sequence of N successive recurrences, a Fourier transform (FFT or DFT) on the Doppler axis for each distance box and for each sub-pattern, leading to P ambiguous distance-speed matrices, of size M/2P distance boxes by N speed boxes, and, where appropriate, applying a digital beamforming processing operation to the distance-Doppler maps thus obtained;
  to the P different ambiguous distance-speed maps thus obtained and for each beam, applying a second distance processing operation of an optimized resolution that is adjusted depending on the speed of the expected moving targets;
  detecting the targets present in each of the beams;
  removing distance-speed ambiguity from the detected targets in the distance-speed maps, using the unambiguous Doppler frequency.

The processing operations applied on reception and covering all these operations is now described in more detail.

In a first step, a first distance processing operation consisting in the low-resolution distance compression is performed. More precisely, for each sub-pattern and each recurrence 10 of a given Doppler burst 20, a distance-compression processing operation is performed by synchronous demodulation followed by an FFT (or DFT) over the duration T/P of the sub-pattern, leading to a separation of the various targets into M/P ambiguous distance boxes of low resolution $$\frac{PC}{2B}.$$

For example, for a complete band of 100 MHz and a division of the waveform into four sub-patterns (P=4), the distance resolution at the output of the FFT is 6 metres, corresponding to a band of 25 MHz. The signal received over the short length of the ramp of index p after synchronous demodulation, p varying from 0 to P−1, may be written:

$$s(t_c) = e^{-2j\pi \cdot \frac{2(D+pv_rT/P)}{C}\left(F+k_p \cdot \frac{B}{P}\right)} \cdot e^{-2j\pi\left(\frac{2DB}{CT}+\frac{2v_r}{\lambda}\right)t_c} \quad (3)$$

where:
B is the complete emission frequency band;
P is the number of ramps forming the complete pattern 30 (see FIG. 3);
F is the lowest frequency of the complete pattern;
T is the duration of the complete pattern;
D is the distance from the target to the radar;
$v_r$ is the speed of movement of the target;
$t_c$ is the "short" timescale corresponding to a duration of analysis of a single sub-pattern;
$T_r$ is the recurrence period of the complete pattern, corresponding to the "long" timescale;
n is the index of the ramp in the process of being analyzed;
C is the speed of light;
$k_p$ is the integer comprised between 0 and P−1 corresponding to the frequency shift $k_pB/P$ of the ramp of index p with respect to F;
λ is the wavelength of the emission signal, which is considered to be constant relative to the Doppler effect.

The indices p and n indicate the rank of the sub-patterns or of the ramps; the terms index and rank will be used interchangeably below.

The phase at the origin for the sub-pattern of index p is written:

$$\varphi_{0p} = -2\pi \cdot \frac{2(D+pv_rT/P)}{C}\left(F+k_p \cdot \frac{B}{P}\right)$$

and the beat frequency, which is identical for all the sub-patterns 21, 22, 23, 24 is written:

$$f_b = \frac{2BD}{CT} + F_d \text{ with } F_d = \frac{2V_r}{\lambda}.$$

The signal received in the short timescale of the ramp of index p after synchronous demodulation, p varying from 0 to P−1, may then be written:

$$s(t_c) = e^{-j\varphi_{0p}} \cdot e^{-2j\pi f_b t_c} \quad (4)$$

the M-point Fourier transform of which may be written for the filter of index m corresponding to the maximum energy:

$$S_{p,m} = e^{-j\pi\left(f_b-\frac{m}{T}\right)^{N-1}} \frac{\sin\left(M\pi\left(f_b-\frac{m}{T}\right)\right)}{\sin\left(\pi\left(f_b-\frac{m}{T}\right)\right)} e^{-j\varphi_{0p}}$$

In the preceding expression, the only term dependent on the index p of the sub-pattern is $e^{-j\varphi_{0p}}$.

Thus, it is possible to express the response output from the Fourier transform for the sub-pattern of rank p more simply in the form:

$$S_{p,m} = K_m e^{-j\varphi_{0p}}$$

where $K_m$ is independent of the index p of the sub-pattern.

Generalising to all the recurrences of the Doppler burst of index n, the following is obtained:

$$S_{p,m}(n) = K_m e^{-j\varphi_{0p}(n)} \quad (5)$$

with:

$$\varphi_{0p}(n) = -2\pi \cdot \frac{2(D(n)+pv_rT/P)}{C}\left(F+k_p \cdot \frac{B}{P}\right) \quad (6)$$

where D(n) is the distance to the target in the $n^{th}$ recurrence, namely:

$$D(n) = D_0 + v_r nT_r \quad (7)$$

$D_0$ being the distance at the time origin.

For the sub-pattern of index p, it is thus possible to write the phase of the signal in the $n^{th}$ recurrence:

$$\varphi_{0p}(n) = -2\pi \cdot \frac{2(D_0+v_r nT_r)\left(F+k_p \cdot \frac{B}{P}\right)}{C} - 2\pi \frac{2(pv_rT/P)\left(F+k_p \cdot \frac{B}{P}\right)}{C}$$

which may be simplified to:

$$\varphi_{0p}(n) = -\frac{4\pi D_0}{\lambda_p} - 2\pi \frac{pF_dT}{P} - 2\pi F_d nT_r \quad (8)$$

since $$F_d = \frac{2v_rF}{C} \cong \frac{2v_r\left(F+k_p \cdot \frac{B}{P}\right)}{C},$$

and assuming $$\lambda_p = \frac{C}{\left(F+k_p \cdot \frac{B}{P}\right)} \quad (9)$$

It will be noted that $\varphi_{0p}(n)$ contains:
a Doppler term that is common to all the sub-patterns, $-2\pi F_d nT_r$, and;
a phase term that is different for each pattern:

$$-\frac{4\pi D_0}{\lambda_p} - 2\pi \frac{pF_dT}{P}.$$

In a second step, an FFT (or DFT) is performed on each distance box corresponding to the detected range and for each sub-pattern, on the Doppler axis over the duration of the Doppler burst corresponding to the long timescale $NT_r$.

Analogously to the Fourier transform on the distance axis, the response output from the Fourier transform on the Doppler axis for the sub-pattern of rank p may be expressed simply in the form:

$$U_{m,n,p} = K'_{m,n} e^{-j\left(\frac{4\pi D_0}{\lambda_p}+2\pi \frac{pF_dT}{P}\right)} \quad (10)$$

$K'_{m,n}$ is independent of the index p of the sub-pattern.
The index m corresponds to the distance filter of index m, centred on the ambiguous distance $$\frac{PC}{2B},$$

or resolution $$\frac{PC}{2B}.$$

The index n corresponds to the speed filter of index n, centred on the Doppler frequency $$\frac{n}{NT_r}$$

of resolution $$\frac{1}{NT_r}.$$

The index p corresponds to the sub-pattern p of the waveform.

At this stage, the processing has produced P matrices or ambiguous "distance-Doppler maps" of distance resolution $$P\Delta D = \frac{PC}{2B}$$

and of Doppler resolution $$\Delta F_d = \frac{1}{NT_r},$$

comprising M/2P×N elements $U_{mn,p}$.

In a third step, these distance-Doppler maps are separated into at least two sub-maps in the Doppler domain, the first corresponding, according to carrier speed, to the possible domain of stationary targets, and the one or more second sub-maps corresponding to the domain of moving targets, depending on whether or not the moving-target domain is decomposed into sub-speed domains.

The estimation of the Doppler bounds of the stationary-target field is obtained via knowledge of the speed of the carrier V, of the aperture angle and steering angle of the radar beam and of the wavelength λ.

Specifically, for a radar beam of azimuthal angular aperture Δθ irradiating the road along the axis of movement of the vehicle and steered in the direction θ=0, the Doppler domain of corresponding stationary targets is comprised between:

$$F_{dmin} = \frac{2V\cos(\Delta\theta/2)}{\lambda} \text{ and } F_{dmax} = \frac{2V}{\lambda}.$$

Typically, for Δθ=3°, V=36 m/sec and λ=3.9 mm:
$F_{dmin}$=18492 Hz, and
$F_{dmax}$=18518 Hz.

The Doppler band corresponding to stationary obstacles is limited to 25 Hz, corresponding to a single filter if the duration of the Doppler burst is 40 ms, corresponding to a Doppler resolution of 25 Hz.

For a radar beam of azimuthal angular aperture Δθ irradiating the road along the axis of movement of the vehicle and steered with respect to the axis θ=0 by an angle α larger than Δθ, the Doppler domain of corresponding stationary targets is comprised between:

$$F_{dmin} = \frac{2V\cos(\alpha - \Delta\theta/2)}{\lambda} \text{ and } F_{dmax} = \frac{2V\cos(\alpha + \Delta\theta/2)}{\lambda}.$$

All else moreover being equal, for a steer-off of 10°, the Doppler band is then 168 Hz, corresponding to 7 filters.

This example shows that the Doppler domain in which it is necessary to carry out distance processing with the maximum resolution is very small, and may be easily isolated. It is possible in particular to easily isolate stationary targets.

The moving-target field may itself be decomposed into various relative speed domains in which the remaining processing will be performed differently as will be described below.

This remaining processing includes a second distance-compression processing operation carried out on the P distance-Doppler maps obtained following the first distance-compression processing operation. This second processing operation depends on the expected relative speed of the target. In particular, one type of processing operation is applied to stationary targets and another type of processing operation is applied to moving targets.

To begin with the second distance processing operation, applied to the elements of the distance-Doppler maps corresponding to stationary targets, will be described.

In this second processing operation, the radar aims to compress the signal to the maximum resolution:

$$\Delta D = \frac{C}{2B} = \frac{C}{2P\Delta F}$$

This processing operation is applied to a first limited portion of the distance-Doppler map, corresponding to stationary targets, i.e. to a number $N_f$ of Doppler filters such that $N_f$ is very much lower than N ($N_f \ll N$). It consists in carrying out a summation that is coherent, i.e. in amplitude and in phase, on the distance axis of the P ambiguous distance-Doppler maps.

Figure 5:
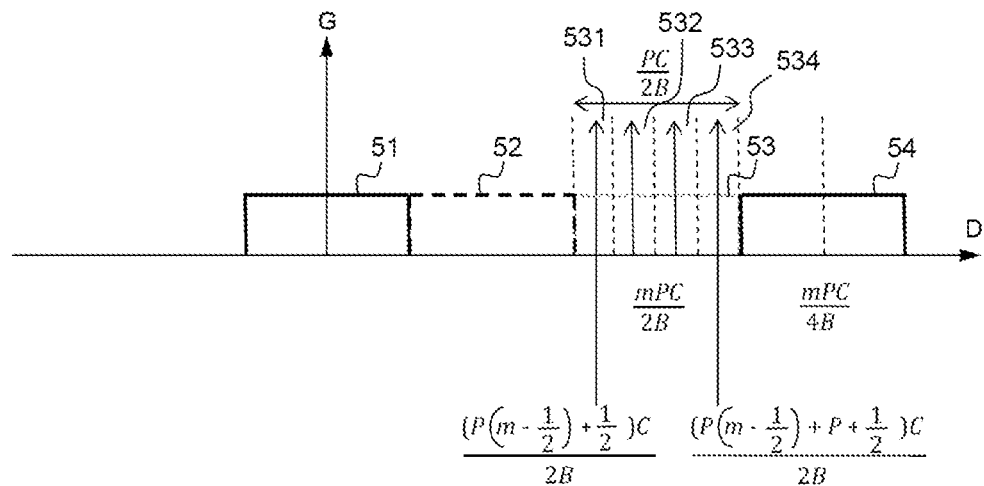
FIG. 5, an illustration of the distance filters associated with the sub-patterns of a wave according to the invention.

To do this, with reference to FIG. 5, each distance filter 51, 52, 53, 54 centred on $$m\frac{PC}{2B}$$

and of width $$\frac{PC}{2B}$$

is decomposed into P adjacent filters 531, 532, 533, 534 of width $$\frac{C}{2B},$$

centred on me distance:

$$D_{m,p} = \frac{\left(P\left(m-\frac{1}{2}\right)+p+\frac{1}{2}\right)C}{2B}$$

p varying from 0 to P−1.

P is equal to 4 in the example of FIG. 5, each filter being decomposed into four filters.

In order to perform the coherent summation making it possible to compress the signals in the distance filters 531, 532, 533, 534 of resolution C/2B, it is necessary to compensate for the differences in phase between the P distance-Doppler maps that result from the frequency shift and time delay between the various sub-patterns 21, 22, 23, 24.

The phase compensation to be applied for each sub-pattern of rank p, relative to the distance filter 53 of rank m and to the speed filter of index n is:

$$+\frac{4\pi D_{m,p}}{\lambda_p}$$

as regards the frequency shift and;

$$2\pi \frac{p\frac{n}{NT_r}T}{P}$$

as regards the time delay.

These phase terms correspond to a compensation with respect to a distance and to a speed of a target, respectively, that are located at the centre of the distance filter 531, 532, 533, 534 and at the centre of the speed filter in question, respectively.

Thus a basis of P unit vectors $V_{m,n,p}$ is obtained such that:

$$V_{m,n,p} = e^{j\left(\frac{4\pi D_{m,p}}{\lambda_p}+2\pi\frac{p\frac{n}{NT_r}T}{P}\right)}$$

The compression on the distance axis is performed by carrying out the sum of the projections of the P vectors $U_{m,n,p}$ onto the P vectors $V_{m,n,p}$ according to the following relationship:

$$W_{m,n,p} = \sum_{p=0}^{P-1} U_{m,n,p} V_{m,n,p}$$

that is:

$$W_{m,n,p} = \sum_{p=0}^{P-1} K'_{m,n} e^{-j\left(\frac{4\pi D_0}{\lambda_p}+2\pi\frac{pF_dT}{P}\right)} e^{j\left(\frac{4\pi D_{m,p}}{\lambda_p}+2\pi\frac{p\frac{n}{NT_r}T}{P}\right)}$$

As output from this processing operation, a single distance-Doppler map of size M/2 distance boxes by $N_f$ speed boxes is obtained. If the radar comprises a plurality of reception channels, digital beamforming processing operations may then be applied to this distance-speed (or distance-Doppler) map.

The second distance-compression processing operation applied to the elements of the distance-Doppler maps corresponding to moving targets will now be described. The example processing operation described is applied to targets of high relative speed.

In this second processing operation, it is sought to compress the signal to an intermediate resolution $$\Delta D = \frac{QC}{2B}$$

(Q being an integer multiple of 2) adapted to their relative speed, then an non-coherent summation of the resulting distance-Doppler maps is performed.

The principle of this compression processing operation is identical to that of the processing operation described for stationary targets, but this operation decomposes the distance filter not into P filters of width $$\frac{C}{2B},$$

but into Q filters of width $$\frac{QC}{2B}.$$

It is applied to a second limited portion of the distance-Doppler map, corresponding to high speeds, for example to $N_{ve}$ Doppler filters, such that $N_{ve} < N$. It may moreover be carried out in various speed domains with resolutions ΔD which are different within the whole moving-target domain.

A partial distance compression is carried out to pass from a resolution $$\frac{PC}{2B}$$

to a resolution $$\frac{QC}{2B}$$

by associating $$\frac{P}{Q}$$

patterns covering $$\frac{P}{Q}$$

adjacent frequency bands of width $$\frac{B}{P},$$

the whole lot covering a band $$\frac{B}{Q}.$$

This operation is performed on all of the distance-Doppler maps generated by the low-resolution distance processing i.e. the maps obtained from all the sub-patterns, by grouping together maps originating from patterns the bands of which are adjacent and cover a band $$\frac{B}{Q}.$$

Thus Q ambiguous distance-speed maps of size MQ/2 distance boxes by $N_{ve}$ speed filters are obtained. Next an non-coherent summation of the Q distance-speed maps, i.e. a power summation, is carried out, thereby achieving an increase in frequency diversity, this increase being related to the difference in the carrier frequencies of the sub-patterns used.

Figure 6:
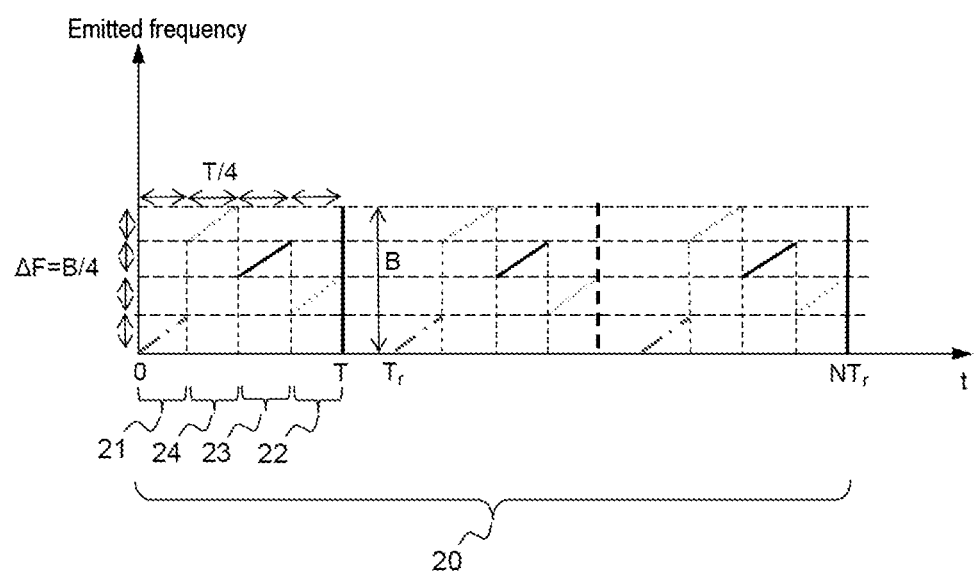
FIG. 6, a radar wave according to the invention in which the sub-patterns are arranged in a particular order.

For example, considering the case where the waveform is decomposed into four sub-patterns (P=4), the whole lot covering a frequency band B as illustrated in FIG. 6, it is possible to carry out a processing operation producing Q=2 distance-Doppler maps having a distance resolution of $$\frac{B}{2}$$

by associating on the one hand the patterns 21, 22 of ranks 1 and 4, and on the other hand the patterns 24, 23 of ranks 2 and 3.

Next a quadratic summation of the two maps thus obtained is carried out with a frequency diversity of $$\frac{B}{2}.$$

This step is described in more detail below. The objective is to decompose, in the P distance-speed maps generated by the low-resolution distance processing, each distance filter 51, 52, 53, 54 centred on $$m\frac{PC}{2B}$$

and of width $$\frac{PC}{2B}$$

into Q adjacent filters of width $$\frac{QC}{2B},$$

each centred on distances:

$$D_{m,q} = \frac{\left(P\left(m - \frac{1}{2}\right) + \frac{Q}{2}(1+q)\right)C}{2B}$$

q varying from 0 to Q−1.

An integer number $$\frac{P}{Q}$$

of emission sub-patterns corresponding to $$\frac{P}{Q}$$

adjacent frequency sub-bands of width $$\frac{B}{P}$$

lot covering a continuous band of width $$\frac{B}{Q}$$

depending on the radar emission frequency F.

Noting:

j the ranks of these sub-patterns, for j varying from 0 to $$\frac{P}{Q} - 1;$$

λj the wavelength corresponding to the frequency $$\lambda_j = \frac{C}{\left(F + j \cdot \frac{B}{P}\right)};$$

and $$\frac{\alpha_j T}{P}$$

the delay of the sub-pattern of rank j with respect to the sub-pattern of the first rank (index 0);

on being output from the Doppler processing, the signal relating to the pattern of rank j corresponding to the distance $D_0$ and to the Doppler frequency $F_d$ may be written:

$$U_{m,n,j} = K'_{m,n} e^{-j\left(\frac{4\pi D_0}{\lambda_j} + 2\pi \frac{\alpha_j F_d T}{P}\right)}$$

and the phase compensation to be applied for each sub-pattern of rank j, relative to the original distance filter of rank m and to the speed filter of rank n is:

$$+\frac{4\pi D_{m,q}}{\lambda_j}$$

as regards the frequency shift and;

$$2\pi \frac{\alpha_j \frac{n}{NT_r} T}{P}$$

as regards the time delay of the sub-pattern j with respect to the time origin of the current recurrence.

These phase terms correspond to a compensation with respect to a distance and to a speed of a target, respectively, that are located at the centre of the distance filter and at the centre of the speed filter in question, respectively.

Thus a basis of $$\frac{P}{Q}$$

unit vectors $V_{m,n,j}$ is obtained such that:

$$V_{m,n,j} = e^{j\left(\frac{4\pi D_{m,q}}{\lambda_j} + 2\pi \frac{\alpha_j \frac{n}{NT_r} T}{P}\right)}$$

The compression on the distance axis is performed by carrying out P/Q sums of the projections of the Q vectors $U_{m,n,j}$ onto the P vectors $V_{m,n,j}$ according to the following relationship:

$$W_{m,n,q} = \sum_{j=0}^{\frac{P}{Q}-1} U_{m,n,j} V_{m,n,j}$$

that is:

$$W_{m,n,q} = \sum_{j=0}^{\frac{P}{Q}-1} K'_{m,n} e^{-j\left(\frac{4\pi D_0}{\lambda_j} + 2\pi \frac{\alpha_j F_d T}{P}\right)} e^{j\left(\frac{4\pi D_{m,q}}{\lambda_j} + 2\pi \frac{\alpha_j \frac{n}{NT_r} T}{P}\right)}.$$

At the end of this processing, a distance-Doppler matrix of size MQ/2 distance boxes by $N_{ve}$ Doppler filters is obtained. The operation is repeated on the P-P/Q remaining sub-patterns to form Q distance-Doppler matrices of size MQ/2 distance boxes by $N_{ve}$ Doppler filters. In the end, a new distance-Doppler map having an increased distance resolution is obtained.

If the radar comprises a plurality of reception channels, digital beamforming processing is then applied to these Q distance-speed maps. Next, for each beam, an non-coherent summation of the various matrices thus obtained is carried out in order to obtain a single matrix comprising MQ/2 distance boxes by $N_{ve}$ Doppler filters.

In a following step, for the elements of the distance-Doppler maps corresponding to the moving targets of lowest relative speeds, the non-coherent summation of the P distance-Doppler maps obtained via the low-resolution distance compression processing is carried out.

This processing is applied to the last limited portion of the distance-Doppler map, corresponding to low speeds, for example to $N_{vf}$ Doppler filters, such that $N_{vf} < N$, with $N = N_f + N_{ve} + N_{vf}$.

If the radar comprises a plurality of reception channels, digital beamforming processing is applied beforehand to the P distance-speed maps. Next, for each beam, an non-coherent summation of the various maps thus obtained is carried out in order to obtain a single map comprising M/2 distance boxes by $N_{vf}$ Doppler filters.

For all of the obtained distance-speed maps, targets are detected then distance-speed ambiguity is removed using the unambiguous Doppler frequency and detected targets are updated on the distance axis for each beam.

Figure 7:
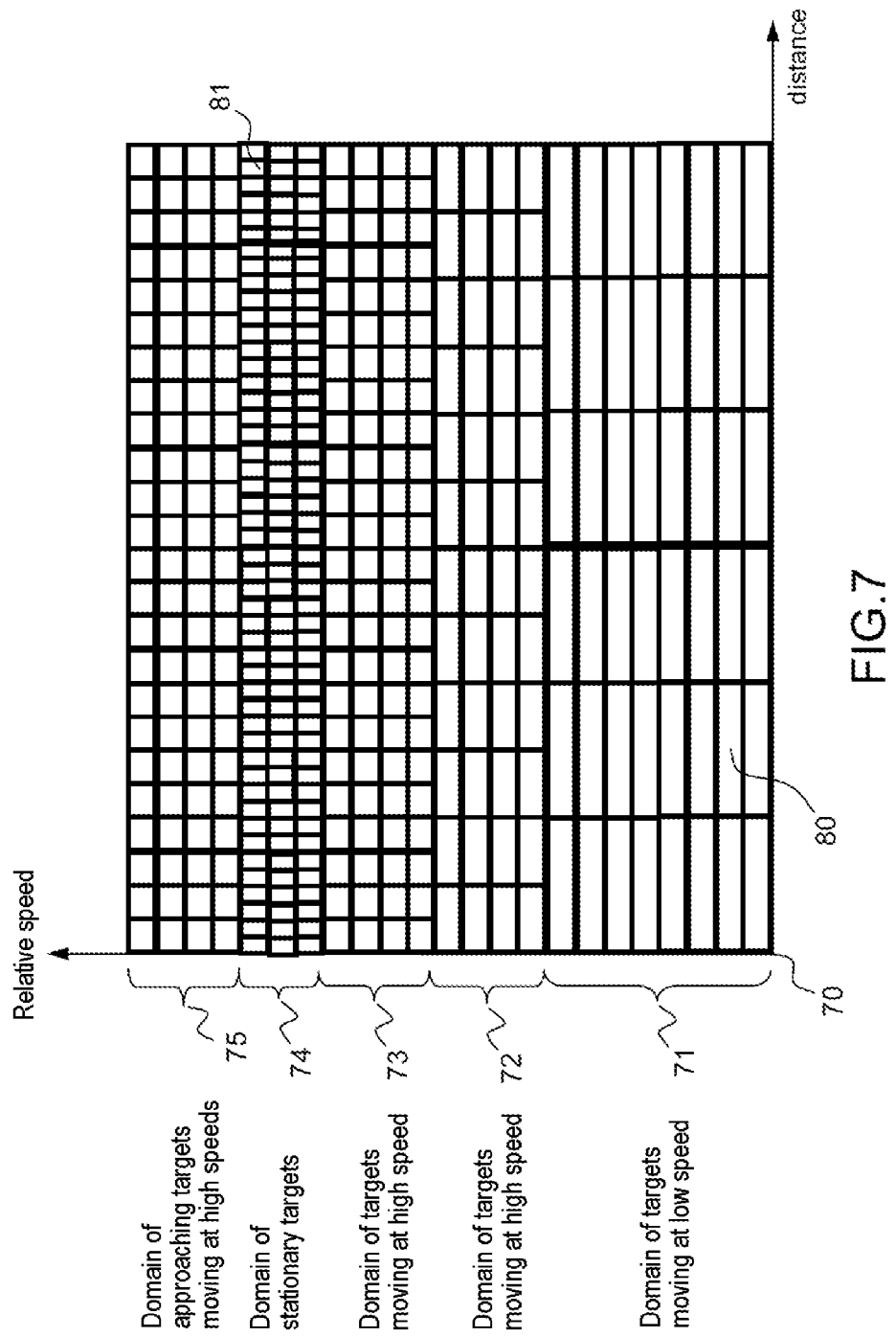
FIG. 7, an example of decomposition of distance-Doppler maps into speed domains.

FIG. 7 symbolically shows the form of the decomposition into distance/Doppler filters of the domain sensed by the radar, following the processing operations described above. The axis of the abscissae represents distance, the origin 70 corresponding to the position of the radar. The axis of the ordinates represents the relative speed of the targets with respect to the radar. A distance/Doppler filter 80 is characterized by a distance-wise width and a speed-wise width.

The decomposition is performed into distance boxes the size of which is adjusted depending on the relative speed of the targets. The speed-wise width for example remains constant. To this end, the speed domain is divided into a plurality of zones or domains 71, 72, 73, 74, 75 and to each of these zones corresponds a distance-wise width of the distance/speed filter. Beside the domain of stationary targets, a plurality of speed domains are taken into account.

A first speed domain 71 corresponds to targets moving at low speeds, this domain corresponds to ACC-type applications. These are targets approaching the vehicle carrying the radar, driving in front of it but less fast. A second speed domain 72 covers targets moving at higher speeds. A third speed domain 73 covers targets moving at even higher speeds. A fourth domain 74 corresponds to stationary targets and a fifth domain corresponds to moving targets approaching at high speeds from the opposite direction. This corresponds to oncoming vehicles and in particular should never be encountered on motorways.

The distance-Doppler map of FIG. 7 shows that the smallest distance boxes 81 are assigned to stationary targets, i.e. that the distance resolution is maximum for stationary targets and lowest for moving targets. By adjusting the width of the distance boxes to speed, processor and computational load is significantly decreased. Thus, for the first domain 71 filters of larger distance-wise width are used, thereby limiting the number of filters and therefore the number of computations.

Advantageously, detection range and distance resolution may also be adjusted differently depending on the direction of the beam in question and on distance to further limit computational load.

To end with, an example of an application is presented in which the vehicle carrying the radar is considered to be driving on a motorway at a speed V=130 km/h.

According to Table 1 presented above, the maximum useful band for stationary targets is 100 MHz, corresponding to a distance resolution of 1.5 m, and the maximum duration of the recurrence is 27 μs for a Doppler burst duration of 40 ms.

It is for example possible to choose a recurrence duration of 19.5 μs in order to carry out the Doppler processing via N=2048 point FFT. The waveform may be divided in accordance with FIG. 6 into four sub-patterns of 25 MHz bandwidth, all thereof covering a band of 100 MHz.

Considering a beam of 3° azimuthal aperture steered by 10° from the axis of the vehicle, the stationary-target domain occupies seven speed filters in which maximum-distance-resolution processing is performed. It is for example possible to divide the remaining speed domain into two sub-bands typically covering:

from 0 to 65 km/h for the first;
and from 65 to 129.6 km/h for the second;

in which a distance-compression processing operation with a resolution of 6 m and 3 m, corresponding to a frequency band of 25 MHz and of 50 MHz, is respectively carried out.

With respect to a radar carrying out a distance compression with the maximum resolution of 3 m in the entirety of the speed domain, the number of distance boxes is approximately divided by two in this half of the domain and by four in the other half, this corresponding on the whole to a 60% decrease in computational load.

By automatically adapting the waveform and the associated processing depending on the context, and in particular depending on the speed of the carrier and on the conditions of implementation, the invention advantageously allows the performance of the radar and the processing resources used to detect both moving objects and stationary objects in the entirety of the radar range to be simultaneously optimised. It allows a maximum distance resolution for stationary obstacles and a lower distance resolution for moving obstacles which are separated via the Doppler processing, thereby minimising computational load. In "low-distance-resolution" mode, the probability of target detection is in addition enhanced via frequency diversity.

The invention also allows the risk of mutual interference between radars of the same type to be decreased, because of the diversity of waveforms liable to be in use at a given time by these radars. It moreover allows the efficiency of the waveform to be optimised, because it is not necessary to interleave different waveforms to process all of the distance-speed domain. Lastly, it does not increase electronic load or the complexity of the radar. Specifically, the method according to the invention may be implemented by existing radars without modification of their reception circuits or of their processing circuits. In particular, the processing is simple and easy to implement.

A motor vehicle may advantageously be equipped with a radar implementing the method according to the invention, in order to detect stationary or moving obstacles present in the environment of the vehicle. In particular, the radar may be used for an anticollision function.

The invention claimed is:

1. A radar target-detection method implementing an FMCW waveform, wherein an emitted waveform being formed of a recurring pattern of given period Tr covering an emission frequency band of given width B, each pattern being divided into a given number P of sub-patterns of duration Tr/P covering an excursion frequency band $\Delta F=B/P$, said sub-patterns being mutually spaced by a frequency interval equal to $\Delta F$, said radar target-detection method comprising:

a first distance-compression processing operation by an FMCW radar carrying out a low-resolution distance compression at a scale of each recurring pattern on a fraction B/P of said emission frequency band of width B corresponding to a frequency band covered by each of said sub-patterns;

a Doppler processing operation on a given number N of successive recurrences by the FMCW radar so as to form P ambiguous distance-Doppler maps of low distance resolution, said ambiguous distance-Doppler maps being segmented into at least two speed domains one of which corresponds to stationary targets;

a second distance-compression processing operation on said ambiguous distance-Doppler maps by the FMCW radar, a resolution of which is dependent on the speed domain to which an expected speed of said target belongs;

in a first processing operation said compression by the FMCW radar consisting, for each sub-pattern, in a distance compression by direct demodulation of an emitted signal with a received signal, followed by an M/P-point Fourier transform in a synchronous demodulation operation leading, for each pattern, to a formation of M/2P distance boxes, M/P being an integer; and said expected speed corresponding to a moving target, a second processing operation carrying out a coherent integration by the FMCW radar over all of said ambiguous distance-Doppler maps to produce a new distance-Doppler map, wherein said coherent integration is carried out on each group of distance-Doppler maps corresponding to sub-patterns covering adjacent frequency bands.

2. The method according to claim 1, wherein said Doppler processing operation performs, on said N successive recurrences, a Fourier transform on a Doppler axis for each of said distance boxes and for each sub-pattern, leading to a formation of said P distance-Doppler maps, each being M/2P distance boxes by N Doppler boxes in size.

3. The method according to claim 1, wherein said resolution is maximum for stationary targets.

4. The method according to claim 3, wherein, said expected speed corresponding to a stationary target, the second processing operation performs the compression to a maximum resolution by carrying out the coherent integration of said P distance-Doppler maps in each of a number of distance filters centered on said sub-patterns of resolution:

$$\frac{C}{2B},$$

where C is the speed of light.

5. The method according to claim 4, wherein said coherent integration is carried out after compensation of delays and frequency differences between said sub-patterns.

6. The method according to claim 1, wherein, said expected speed being high, the second processing operation performs a non-coherent integration of at least two distance-Doppler maps of a same distance resolution.

7. The method according to claim 1, wherein the order of said sub-patterns is modified from one emission burst to a following emission burst.

8. The method according to claim 1, wherein the period Tr of said recurring pattern is adjusted depending on a speed of a carrier of said FMCW radar and on the emission frequency in order to meet a condition of Doppler unambiguity for targets approaching at maximum speed.

9. The method according to claim 1, wherein, digital beamforming being carried out on reception on each of said distance-Doppler maps of low distance resolution, the second processing operation is carried out for each beam.

10. The method according to claim 1, wherein said distance resolution depends on a direction of a beam on reception.

11. The method according to claim 1, wherein the ambiguity in a distance measurement is removed by a measurement of a Doppler frequency.

12. An FMCW radar, wherein the FMCW radar is configured to implement the method according to claim 1.

13. The FMCW radar according to claim 12, wherein the FMCW radar is implemented in a motor vehicle.

14. The FMCW radar according to claim 13, wherein the FMCW radar is configured for an anticollision function.

* * * * *